April 14, 1964  S. HABARE  3,128,832
GAUGE WHEEL FOR TWO-WAY PLOW
Filed April 30, 1962  2 Sheets-Sheet 1

INVENTOR.
Serge Habare
Paul O. Pippel
Atty.

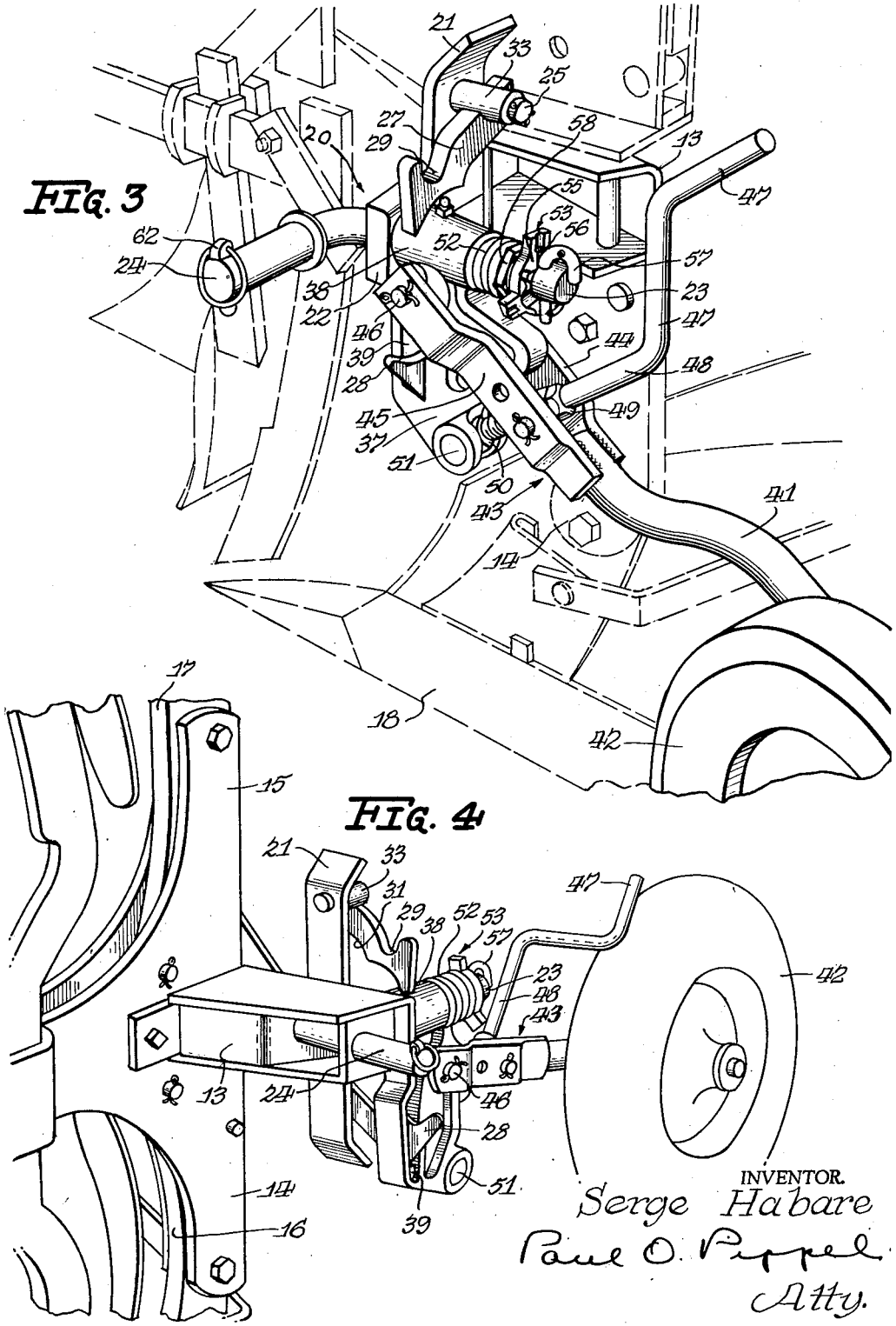

United States Patent Office 3,128,832
Patented Apr. 14, 1964

3,128,832
GAUGE WHEEL FOR TWO-WAY PLOW
Serge Habare, Cauffry par Rantigny, France, assignor to International Harvester Company, Chicago, Ill., a corporation of New Jersey
Filed Apr. 30, 1962, Ser. No. 190,966
Claims priority, application France May 2, 1961
8 Claims. (Cl. 172—224)

This invention relates generally to earth working equipment, and is more particularly concerned with a plow of the rollover type wherein right and left hand plowing units are mounted on a frame extending longitudinally of the direction of travel of the plow and rotatable about the axis thereof to dispose the plow units alternately in operation. More specifically the invention concerns a novel gauge wheel construction especially suitable for plows of the rollover type.

It is generally known, that a single gauge wheel may be used to regulate the plowing depth of both the right and left hand plowing units, the gauge wheel being supported on the rollover frame and rotatable therewith. In such construction, when the plowing units are thrown over from one side to the other, the gauge wheel is free to swing downwardly, under gravitational force, and by the inertia of the throw-over, to resume the gauging function for the reversed plow shares. The gauge wheel being weighty, drops into the operating position with a banging action of such force that over a period of time many parts of the plow become damaged. This necessitates the use of heavy and large parts which can withstand the shock of the impact of the gauge wheel with the ground. This additional weight is undesirable. In the case of a tractor mounted plow, when the plow is in the raised transport position, considerable weight will be concentrated on the rear end of the tractor. When the tractor is transporting the raised plow over rough and uneven terrain, the plow will vibrate and bounce, causing stress on the hitch and lifting apparatus. Lastly, most conventional implements of this type require elaborate and complex means for adjusting the height of the gauge wheel for the proper plowing depth of the right and left hand plowing units.

Accordingly, it is the principal object of the invention to provide a novel single gauge wheel for a rollover plow, of simple construction, adapted to function as a gauging means for both of the alternatively operable plow units, thereby permitting considerable weight reduction for the equipment.

Another object of the invention is the provision of a novel gauge wheel assembly mounted on the rollover frame for rotation therewith and movable automatically into a position, with the least possible banging action, to always serve as the gauging means for the plow unit in operation.

Another object of the invention is the provision of a novel automatic braking means to alleviate the shock of the impact of the gauge wheel with the ground.

Another important object of the invention is the provision of novel gravity operated locking and unlocking means for the gauge wheel operable following the throw over of the plow units.

A still further object of the invention is the provision of a novel gauge wheel carrier adapted to allow the gauge wheel to function as a support for the plow in the raised transport position.

Another object of the invention is the provision of a novel and simple adjustment means for the gauge wheel to regulate the plowing depth of the plowing units.

Other objects and advantages of the invention will become clear from the following detailed description when read in conjunction with the accompanying drawings wherein:

FIGURE 3 is an enlarged perspective view of the rear end of the plow;

FIGURE 4 is another enlarged perspective view of the rear end of the semi-mounted two-way plow embodying the features of this invention;

Figure 5:
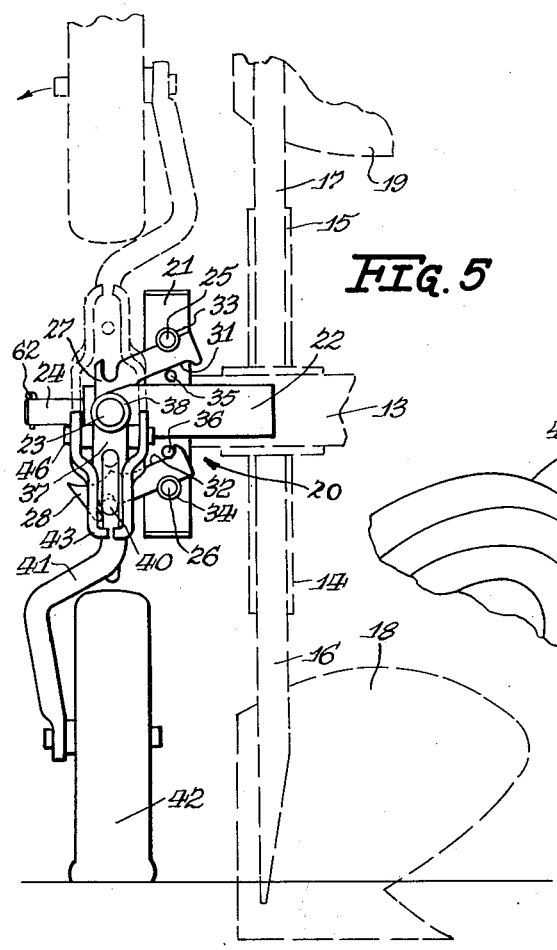
Figure 6:
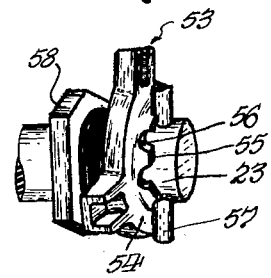

FIGURE 5 is a rear view of the plow, with parts removed, showing the alternately operable right hand plow units in operation, and indicating, in dotted lines, the position of the gauge wheel before it has dropped to its alternate operative position; and FIGURE 6 is a detail of the automatic actuating device for braking the rotational descent of the gauge wheel when the plowing units are rotated from one side to the other.

Figure 1:
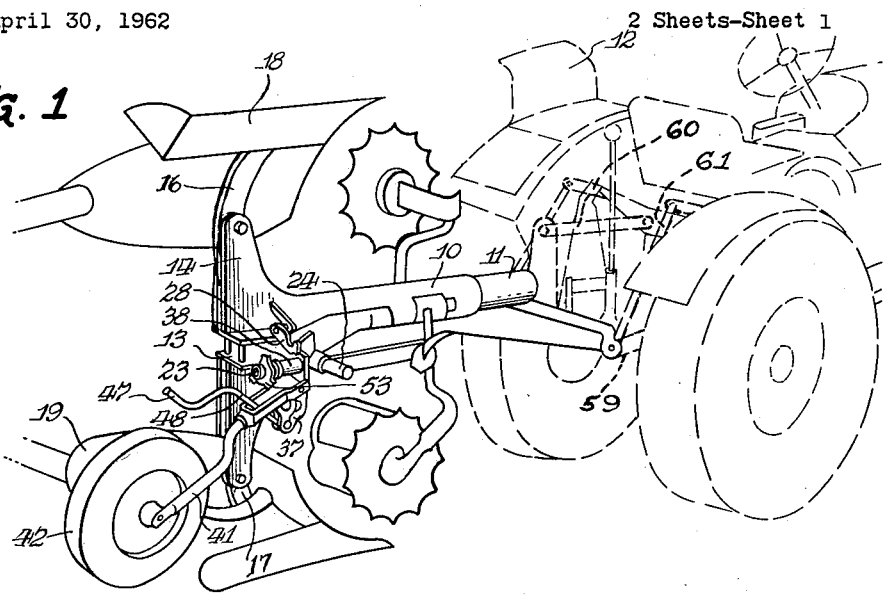
FIGURE 1 is a side view of a tractor-mounted two-way plow, embodying the features of the invention, when the alternately operable left hand plow units are in the operating position.

The general construction of a two-way plow having the gauge wheel assembly of this invention mounted thereon is illustrated in FIGURE 1. Generally, the plow includes a longitudinally extending, rotatable, cylindrical tool carrying sub-frame 10 which is rotatably mounted on a support 11 forming a part of the main frame of the implement which is normally associated with a draft mechanism adapted for connection to the tractor 12. The draft mechanism ordinarily incorporates suitable means (not shown) for revolving the tool carrier 10 about its longitudinal axis on the support 11 and also usually provides for raising the support 11 so as to move the plow bottoms into the air and permit transportation of the plow from one point to another.

A beam structure 13 is affixed to the carrier 10 and extends laterally from one side thereof and provides a support for oppositely disposed pairs of plates forming right and left hand tool supporting brackets 14 and 15. A pair of oppositely directed right and left hand standards 16 and 17 are mounted in the brackets 14 and 15 and are adapted to carry at their ends alternately operating right and left hand bottoms 18 and 19 which may be selectively brought into relatively reversed positions of use by rotating the carrier 10 with the affixed beam 13 around the longitudinal axis of the frame 11.

The above described arrangement is merely exemplary of one form of construction wherein the implement of this invention is a two-way plow and the rotatable carrier 10 and the affixed beam 13 constitute the plow support.

For illustrating the basic principles of the present invention, reference is made to FIGURE 5, which shows a cross-shaped bracket 20 having a rectangularly shaped upright 21 affixed intermediate its ends to a rectangularly shaped cross-piece 22. As shown in the transport position in FIGURE 2, the ends of the upright 21 are bent and extend rearwardly and outwardly therefrom.

Referring again to FIGURE 5, in conjunction with FIGURE 3, one end of the cross-piece 22 is shown affixed to the beam 13, and the other end is shown fixedly supporting a rearwardly extending pivot member in the form of a shaft 23 and a laterally extending shaft 24. A pair of parallel aligned longitudinal posts 25 and 26 are affixed to the upright 21, equidistant from the projected horizontal axis of the longitudinal shaft 23, and are used for the pivotal mounting of a pair of elongated, notched, gravity operated, latching members 27 and 28. The latches 27 and 28 each have a notch 29 and 30 respectively, on one elongated side, at the end thereof, and an abutment surface 31 and 32 respectively, at the other end, on the side opposite the notched side. Sleeves 33 and 34 are affixed respectively to the latching members 27 and 28 and are offset from the center of gravity of the said members so that their notched ends will rotate downward about the axis of the posts 25 and 26. A pair of parallel stop members 35 and 36 are affixed to the upright 21 and are positioned to engage the abutment surfaces 31 and 32, to stop the downward rotation of the latches 27 and 28.

Figure 2:
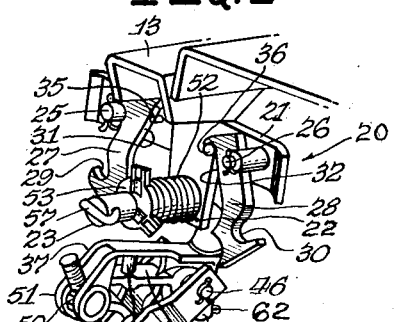
FIGURE 2 is an enlarged detail in perspective showing the manner in which the gauge wheel is mounted for transporting the plow in the raised position.

As shown in FIGURES 1 and 3, a gauge wheel support 37 is pivotally mounted on the longitudinal shaft 23. The gauge wheel support 37 has an upper longitudinally extending sleeve portion 38, which is pivotally mounted on the shaft 23, and a rectangularly shaped opening 39 in its side. FIGURES 2 and 5 show a longitudinal rod 40 extending through the lower portion of the opening 39 and engaging with the notch 30 of the latch 28, to hold the gauge wheel support 37 in the operating position.

The gauge wheel unit comprises an outwardly and downwardly projecting axle 41 having a lower arm carrying a gauge wheel 42, and an upper arm affixed to a U-shaped bracket 43 whose parallel arms 44 and 45 are pivotally mounted to the sides of the gauge wheel support 37 by a pin 46 extending therethrough.

A lifting and lowering apparatus is positioned between the U-shaped bracket 43 and the support 37 for regulating the operating position of the gauge wheel relative to the operating plowing unit. The apparatus comprises a crank-axle 47 having an arm 48 extending downwardly and forwardly through and journalled in a swivel 49 pivotally carried between the arms 44 and 45 of the U-shaped bracket 43, the remainder of the downwardly and forwardly projecting arm 48 being threaded for reception in a threaded swivel 50 pivotally anchored in a lower stirrup portion 51 of the gauge wheel support 37.

As shown in FIGURE 3, a braking means is provided consisting of a spring 52 compressed on the shaft 23 against the sleeve 38 of the gauge wheel support 37, for braking the rotational descent of the gauge wheel 42 about the axis of shaft 23. The spring 52 is compressed against the sleeve 38 by an expandable and retractable actuating element in the form of a washer 53 including a cam element 54, illustrated in FIGURE 6, having on its rear face curved projections 55 separated by depressions 56, a stop pin 57, extending through shaft 23, being received in diametrically opposed depressions 56. Cam element 54 is threaded to receive a threaded bolt portion 58 engageable with the rear end of the spring. The compression on the spring 52 is adjusted by turning the threaded bolt portion 58 of the washer 53. Since the spring 52 is compressed between the sleeve 38 and the washer 53, there is sufficient resistance between these parts so they rotate together about the axis of shaft 23 when the gauge wheel 42 is dropping into the operating position. The cammed portion 54 will override the stop pin 57, causing pulsating compressive forces to be applied to the spring 52 each time the diametrically opposite projections 55 of the cam element 54 pass over the pin 57.

Reference is now made to the drawings for the operation of the invention. In FIGURES 5 and 3, the invention is shown in operation with the right hand plowing unit 18. The gauge wheel 42 is held in the right hand operating position by the latch 28 engaging the rod 40, the latch 27 hanging freely from the post 25.

To reverse the plow units from one operating position to the other, as shown in FIGURE 1, the support frame 11 is raised sufficiently to clear the right-hand plowing unit 18 and then the tool carrier 10 is revolved 180° about the axis of the frame 11 to bring the left hand plowing unit 19 into the operating position. The cross-shaped bracket 20 being affixed to the beam 13 revolves bodily with the beam carrying the latched gauge wheel support 37 and gauge wheel 42 through 180° to a position corresponding to that shown in the dotted lines in FIGURE 5. When this occurs the latch 28 is overcenter and due to gravity will pivot downward about the axis of post 26 releasing the latch from the rod 40. The other latch 27 also being over-center will pivot downward about the axis of post 25 until its abutment surface 31 strikes the stop 35.

When the unlatched gauge wheel support 37 and gauge wheel 42 begins its pivotal descent about the axis of shaft 23, its descent is substantially braked by the action of the cammed washer 53 overriding the stationary pin 57 in the shaft 23. Each time the diametrically opposite projections 55 pass over the pin 57, there is additional compression applied to the already compressed spring 52, providing sufficient resistance to gradually reduce the speed of descent of the gauge wheel.

After the gauge wheel 42 has rotated back into its operating position, the latch 27 engages with the rod 40 thereby locking the gauge wheel into the operating position for the left-hand plowing unit 19.

There is no need to adjust the plowing depth of the left hand plowing unit 19, since the common gauge wheel lifting and lowering apparatus retains the depth selected for the right hand plowing unit 18. When it is desired to adjust the plowing depth, the operator merely turns the crank-axle 47 in one direction or the other to raise or lower the gauge wheel 42 thereby adjusting the plowing depth for both plowing units 18 and 19 at the same time.

To transport the plow from one place of operation to another, the support frame 11 is raised by conventional mechanisms indicated in dotted lines in FIGURE 1 and including lower links 59 and an upper link 60 connecting the implement to the tractor and raised by lifting links 61 powered by suitable means, not shown, on the tractor, and the tool carrier 10 is rotated to a position where both the right and left hand plow units 18 and 19 are in the inoperative position, that is, horizontal with the ground and vertically above the axis of the carrier 10 as shown in FIGURE 2. Thus when the carrier 10 is rotated for the transport position of the plow, the shaft 24 will be in a vertically downward position. The gauge wheel support 37 and gauge wheel 42 are removed from the longitudinal shaft 23 and are mounted on the downwardly projecting vertical shaft 24 and secured thereto by a linchpin 62, with the handle of the crank-axle 47 pointing forwardly and downwardly towards the ground to obtain the maximum clearance between the ground and the rear end of the plow. The support frame 11 is lowered and the gauge wheel now serves to support the rear end of the tractor mounted plow in the raised transport position.

It is believed that the operation of the novel gauge wheel assembly of this invention should be understood from the foregoing description. It may be noted, however, that the invention has been described in its preferred embodiment only, and that modifications may be made in the invention without departing the from the spirit thereof or the scope of the appended claims.

The embodiments of the invention for which an exclusive property or privilege is claimed are defined as follows:

1. In a two-way plow having a main supporting frame and a tool-carrying sub-frame including alternately operable right and left hand plow units mounted on the main frame for rotation about a longitudinal axis to alternately place one plow unit in operation while the other is raised, power lift means for raising said main and sub-frames above the ground to accommodate said rotation of the tool carrying sub-frame, a rearwardly extending shaft member secured to the sub-frame, a ground engaging wheel unit mounted on said shaft for rotation bodily with the sub-frame from a position with the wheel unit disposed on one side of and below the axis of rotation of the sub-frame to a position on the other side thereof and adapted to swing downwardly by gravity about the axis of said shaft to a ground engaging position below said axis when the other of said plow units is moved into operating position, axially yieldable means mounted on said shaft and reacting between the shaft and the wheel unit to resist the downward swinging of the latter about the axis of the shaft, and means actuated by said downward swinging of the wheel unit for increasing the resistance thereto, said yieldable means comprising a coil spring surrounding the shaft and under compression between the shaft and the wheel unit to resist the downward swinging of the wheel unit about the axis of the shaft.

2. The invention set forth in claim 1, wherein said wheel unit is provided with a bearing portion in which the shaft is received and which engages one end of the spring, and a transverse pin is mounted in the end of the shaft and operatively engages the other end of the spring.

3. The invention set forth in claim 2, wherein an actuating element is mounted on the shaft between the spring and said stop and is rotatable with the wheel unit, said actuating element having means thereon cooperable with said stop to increase the compression on said coil spring during downward swinging of the wheel unit about the axis of said shaft.

4. The invention set forth in claim 3, wherein said actuating element is a washer having a cam face engageable with said pin.

5. The invention set forth in claim 4, wherein said cam face has circumferentially spaced alternate projections and depressions engaging said pin to intermittently compress the spring during downward swinging of the wheel unit.

6. The invention set forth in claim 5, wherein said actuating element is axially adjustable in length to vary the initial compression of the coil spring.

7. In a two-way plow having a main supporting frame and a tool-carrying sub-frame including alternately operable right and left hand plow units mounted on the main frame for rotation about a longitudinal axis to alternately place one plow unit in operation while the other is raised, power lift means for raising said main and sub-frames above the ground to accommodate said rotation of the tool carrying sub-frame, means serving as a shaft carried by the sub-frame, a ground engaging wheel unit having a bearing portion mounted on said shaft means for rotation with the sub-frame from one side to the other of the axis of rotation of the sub-frame and adapted to swing downwardly by gravity about the axis of said shaft to a ground engaging position when the other of said plow units is moved into operating position, a stop on the end of the shaft, a coil spring on the shaft compressed between the stop and the wheel unit to oppose the downward swinging of the wheel unit about the axis of the shaft and axially adjustable means mounted on the shaft and engageable with one end of said spring for selectively adjusting the tension on the spring, said adjustable means comprising a washer having one side engageable with one end of the spring and having a camming element on its other side engageable with the stop.

8. In a two-way plow having a main supporting frame and a tool-carrying sub-frame including alternately operable right and left hand plow units mounted on the main frame for rotation about a longitudinal axis to alternately place one plow unit in operation while the other is raised, power lift means for raising said main and sub-frames above the ground to accommodate said rotation of the tool carrying sub-frame, means serving as a shaft carried by the sub-frame, a ground engaging wheel unit having a bearing portion mounted on said shaft means for rotation with the sub-frame from one side to the other of the axis of rotation of the sub-frame and adapted to swing downwardly by gravity about the axis of said shaft to a ground engaging position when the other of said plow units is moved into operating position, a stop on the end of the shaft, a coil spring on the shaft compressed between the stop and the wheel unit to oppose the downward swinging of the wheel unit about the axis of the shaft and axially adjustable means mounted on the shaft and engageable with one end of said spring for selectively adjusting the tension on the spring, and automatic latching means mounted on the sub-frame and operatively engageable with the wheel unit to lock the latter in its operating position, said latching means being releasable upon downward swinging of the wheel unit when the sub-frame is rotated to its alternate operating position.

References Cited in the file of this patent

UNITED STATES PATENTS

| 2,760,420 | Pursche | Aug. 28, 1956 |
| 2,927,651 | Murray | Mar. 8, 1960 |
| 2,959,232 | Gordon | Nov. 8, 1960 |
| 3,013,618 | Zeltwanger | Dec. 19, 1961 |

FOREIGN PATENTS

| 1,107,356 | France | Aug. 3, 1955 |
| St 7,223 | Germany | Apr. 26, 1956 |
| 971,081 | Germany | Dec. 4, 1958 |
| 665,664 | Great Britain | Jan. 30, 1952 |